(12) United States Patent
Tarbet et al.

(10) Patent No.: US 10,774,429 B2
(45) Date of Patent: Sep. 15, 2020

(54) ANTI-CORROSION NANOPARTICLE COMPOSITIONS

(71) Applicant: ATTOSTAT, INC., Salt Lake City, UT (US)

(72) Inventors: Bryon J. Tarbet, Highland, UT (US); William H. Niedermeyer, West Jordan, UT (US)

(73) Assignee: ATTOSTAT, INC., Salt Lake City, UT (US)

( * ) Notice: Subject to any disclaimer, the term of this patent is extended or adjusted under 35 U.S.C. 154(b) by 971 days.

(21) Appl. No.: 15/098,071

(22) Filed: Apr. 13, 2016

(65) Prior Publication Data

US 2016/0298243 A1 Oct. 13, 2016

Related U.S. Application Data

(60) Provisional application No. 62/146,587, filed on Apr. 13, 2015, provisional application No. 62/170,882, filed on Jun. 4, 2015.

(51) Int. Cl.
*C23F 11/18* (2006.01)
*F16L 58/04* (2006.01)
*C23F 13/00* (2006.01)
*C09D 5/08* (2006.01)

(52) U.S. Cl.
CPC ............ *C23F 13/005* (2013.01); *C09D 5/084* (2013.01); *C23F 11/18* (2013.01); *F16L 58/04* (2013.01)

(58) Field of Classification Search
None
See application file for complete search history.

(56) References Cited

U.S. PATENT DOCUMENTS

| | | | |
|---|---|---|---|
| 3,133,023 | A | 5/1964 | Vogel |
| 4,515,740 | A | 5/1985 | Schuettenberg et al. |
| 5,047,448 | A | 9/1991 | Tanaka |
| 5,227,608 | A | 7/1993 | Yoshida |
| 5,390,864 | A | 2/1995 | Alexander |
| 5,585,020 | A | 12/1996 | Becker et al. |

(Continued)

FOREIGN PATENT DOCUMENTS

| | | |
|---|---|---|
| CA | 2560837 | 3/2007 |
| CN | WO2006126823 | 11/2006 |

(Continued)

OTHER PUBLICATIONS

Hopp Bela et al, "Production of nanostructures on bulk metal samples by laser ablation for fabrication of low-reflective surfaces", applied physics a materials science & processing, Springer Berlin Heidelberg.

(Continued)

*Primary Examiner* — Joseph D Anthony
(74) *Attorney, Agent, or Firm* — Workman Nydegger (57) ABSTRACT

Anti-corrosion nanoparticle compositions include a carrier and a plurality of nonionic metal nanoparticles. The metal nanoparticles can be spherical-shaped and/or coral-shaped metal nanoparticles. The nanoparticles are selected so as to locate at the grain boundaries of a metal or metal alloy when the anti-corrosion composition is applied to the metal or alloy, thereby reducing or preventing intergranular corrosion of the metal or alloy.

17 Claims, 6 Drawing Sheets

(56) References Cited

U.S. PATENT DOCUMENTS

| | | | |
|---|---|---|---|
| 5,677,075 A | 10/1997 | Fujita | |
| 6,232,264 B1 | 5/2001 | Lukehart | |
| 6,239,453 B1 | 5/2001 | Yamada et al. | |
| 6,509,070 B1 | 1/2003 | Voevodin et al. | |
| 6,660,379 B1* | 12/2003 | Lakowicz | B82Y 15/00 252/500 |
| 6,720,006 B2 | 4/2004 | Hanke | |
| 7,014,737 B2 | 3/2006 | Harutyunyan et al. | |
| 7,252,814 B2* | 8/2007 | De Mello | B01J 19/0093 422/129 |
| 7,332,351 B2 | 2/2008 | Tan et al. | |
| 7,371,457 B2 | 5/2008 | Oldenburg et al. | |
| 7,374,730 B2 | 5/2008 | Simard et al. | |
| 7,384,560 B2 | 6/2008 | Martens et al. | |
| 7,449,679 B2 | 11/2008 | Plewa | |
| 7,509,993 B1 | 3/2009 | Turng et al. | |
| 7,527,824 B2 | 5/2009 | Becker | |
| 7,553,801 B2 | 6/2009 | Alexander et al. | |
| 7,625,637 B2 | 12/2009 | Kim | |
| 7,662,731 B2 | 2/2010 | Itoh et al. | |
| 7,682,970 B2 | 3/2010 | Grigoropoulos et al. | |
| 7,700,032 B1 | 4/2010 | Lu et al. | |
| 7,884,160 B2 | 2/2011 | Wang et al. | |
| 7,967,876 B2 | 6/2011 | Aradi | |
| 7,985,367 B2 | 7/2011 | Hiromatsu et al. | |
| 8,097,233 B2 | 1/2012 | Porterat | |
| 8,435,602 B1 | 5/2013 | Seal | |
| 8,490,586 B2 | 7/2013 | Gardenier | |
| 8,524,139 B2 | 9/2013 | Toth | |
| 8,685,293 B1 | 4/2014 | Coppa et al. | |
| 8,709,531 B2 | 4/2014 | Miller | |
| 8,802,234 B2 | 8/2014 | Che | |
| 8,883,865 B2 | 11/2014 | DiFrancesco | |
| 8,992,815 B2 | 3/2015 | Hu | |
| 9,463,510 B2 | 10/2016 | Hendi et al. | |
| 9,512,377 B2* | 12/2016 | Binder | C01G 41/00 |
| 9,627,713 B2 | 4/2017 | Moganty et al. | |
| 9,885,001 B2 | 2/2018 | Niedermeyer | |
| 10,099,191 B1* | 10/2018 | Lu | B82Y 30/00 |
| 2001/0031564 A1 | 10/2001 | Suzuki et al. | |
| 2002/0051823 A1 | 5/2002 | Yan | |
| 2003/0012686 A1 | 1/2003 | Andersen et al. | |
| 2003/0086859 A1 | 5/2003 | Kawakami et al. | |
| 2003/0102099 A1 | 6/2003 | Yadav et al. | |
| 2003/0108612 A1 | 6/2003 | Xu | |
| 2003/0228525 A1 | 12/2003 | Kozawa | |
| 2004/0103936 A1* | 6/2004 | Andriessen | H01L 31/0324 136/252 |
| 2004/0214001 A1 | 10/2004 | Oldenburg et al. | |
| 2005/0061779 A1 | 3/2005 | Blumenfeld | |
| 2005/0061785 A1 | 3/2005 | Schroder | |
| 2005/0153071 A1 | 7/2005 | Bouvrette | |
| 2005/0158506 A1* | 7/2005 | Waki | B22F 1/0018 428/848.1 |
| 2005/0247866 A1 | 11/2005 | Plewa | |
| 2005/0258149 A1 | 11/2005 | Glukhoy | |
| 2005/0260276 A1 | 11/2005 | Yang | |
| 2006/0049034 A1 | 3/2006 | Lee | |
| 2006/0142853 A1 | 6/2006 | Wang et al. | |
| 2007/0003603 A1 | 1/2007 | Karandikar | |
| 2007/0029185 A1 | 2/2007 | Tung | |
| 2007/0125196 A1 | 6/2007 | Zhong et al. | |
| 2007/0140951 A1 | 6/2007 | O'Brien | |
| 2007/0141259 A1* | 6/2007 | House | C23C 18/1608 427/256 |
| 2007/0207335 A1 | 9/2007 | Karandikar | |
| 2007/0287202 A1 | 12/2007 | Maehashi et al. | |
| 2008/0006524 A1 | 1/2008 | Liu | |
| 2008/0035682 A1 | 2/2008 | Coffey et al. | |
| 2008/0044148 A1 | 2/2008 | Robinson | |
| 2008/0050448 A1 | 2/2008 | Wilson | |
| 2008/0143021 A1 | 6/2008 | Ehrentraut | |
| 2008/0161631 A1 | 7/2008 | Axtell et al. | |
| 2008/0263940 A1 | 10/2008 | Parish et al. | |
| 2008/0292673 A1 | 11/2008 | Crudden | |
| 2009/0000186 A1 | 1/2009 | Sanders et al. | |
| 2009/0028947 A1 | 1/2009 | Rahman | |
| 2009/0039316 A1* | 2/2009 | Hirai | B82Y 15/00 252/301.6 S |
| 2009/0061230 A1 | 3/2009 | Berkei | |
| 2009/0104179 A1 | 4/2009 | Boyden | |
| 2009/0148484 A1 | 6/2009 | Lin | |
| 2009/0175948 A1 | 7/2009 | Jiang | |
| 2009/0191288 A1 | 7/2009 | Squires | |
| 2009/0246530 A1 | 10/2009 | Murakami et al. | |
| 2010/0040655 A1 | 2/2010 | Ren et al. | |
| 2010/0050872 A1 | 3/2010 | Lee | |
| 2010/0068299 A1 | 3/2010 | van der Krieken et al. | |
| 2010/0072645 A1 | 3/2010 | Hiromatsu et al. | |
| 2010/0080957 A1 | 4/2010 | Chinn | |
| 2010/0092367 A1 | 4/2010 | Porterat | |
| 2010/0154591 A1 | 6/2010 | Islam | |
| 2010/0167958 A1 | 7/2010 | Lin | |
| 2010/0172997 A1 | 7/2010 | Omary | |
| 2010/0180413 A1 | 7/2010 | Jeong | |
| 2010/0183739 A1 | 7/2010 | Newman | |
| 2010/0187091 A1 | 7/2010 | Pierce et al. | |
| 2010/0196192 A1 | 8/2010 | Liu et al. | |
| 2010/0212221 A1 | 8/2010 | Aradi | |
| 2010/0255110 A1 | 10/2010 | Yoon | |
| 2010/0272650 A1 | 10/2010 | Tsukada | |
| 2010/0272770 A1 | 10/2010 | De Windt | |
| 2010/0301013 A1 | 12/2010 | Conneely | |
| 2011/0039078 A1 | 2/2011 | Fournet et al. | |
| 2011/0052460 A1 | 3/2011 | Coffey et al. | |
| 2011/0129536 A1* | 6/2011 | Donati | C08L 5/08 424/488 |
| 2011/0155643 A1 | 6/2011 | Tov | |
| 2011/0192450 A1 | 8/2011 | Liu | |
| 2011/0193025 A1 | 8/2011 | Ichikawa et al. | |
| 2011/0196044 A1 | 8/2011 | Hu | |
| 2011/0201527 A1 | 8/2011 | Lin | |
| 2011/0206753 A1* | 8/2011 | Karpov | A01N 59/20 424/405 |
| 2011/0228890 A1 | 9/2011 | Dean et al. | |
| 2011/0244056 A1 | 10/2011 | Santra | |
| 2011/0297653 A1 | 12/2011 | Ehrentraut | |
| 2012/0088066 A1 | 4/2012 | Aytug et al. | |
| 2012/0124899 A1 | 5/2012 | Difrancesco | |
| 2012/0136164 A1 | 5/2012 | Ying et al. | |
| 2012/0138347 A1* | 6/2012 | Bahnmuller | C09D 11/52 174/257 |
| 2012/0138862 A1 | 6/2012 | Hogan | |
| 2012/0164073 A1 | 6/2012 | Xu et al. | |
| 2012/0174472 A1 | 7/2012 | Mills | |
| 2012/0183674 A1 | 7/2012 | Bonn-Savage | |
| 2012/0301528 A1 | 11/2012 | Uhlmann | |
| 2012/0301531 A1* | 11/2012 | Uhlmann | A01N 59/16 424/405 |
| 2012/0313200 A1 | 12/2012 | Jackrel et al. | |
| 2012/0328701 A1* | 12/2012 | Edelson | A61K 38/4893 424/490 |
| 2013/0001833 A1* | 1/2013 | Niedermeyer | B82Y 40/00 264/400 |
| 2013/0078510 A1 | 3/2013 | Reynolds et al. | |
| 2013/0152823 A1 | 6/2013 | El-Sayed | |
| 2013/0203849 A1 | 8/2013 | Ben Yehuda | |
| 2013/0224477 A1 | 8/2013 | Xu | |
| 2013/0273116 A1 | 10/2013 | Jespersen et al. | |
| 2013/0334104 A1 | 12/2013 | Marsh | |
| 2013/0337998 A1 | 12/2013 | Irving | |
| 2014/0024026 A1* | 1/2014 | Alocilja | G01N 33/5434 435/6.11 |
| 2014/0178513 A1* | 6/2014 | Matthews | B29C 48/475 425/6 |
| 2014/0221543 A1* | 8/2014 | Wang | B22F 1/0018 524/403 |
| 2014/0274830 A1 | 9/2014 | Pol et al. | |
| 2014/0288194 A1 | 9/2014 | Niedermeyer | |
| 2014/0370293 A1 | 12/2014 | Johnson | |
| 2015/0008313 A1 | 1/2015 | Loboda | |
| 2015/0030919 A1 | 1/2015 | Koazawa | |

(56) References Cited

U.S. PATENT DOCUMENTS

| | | | |
|---|---|---|---|
| 2015/0066135 A1 | 3/2015 | Weber et al. | |
| 2015/0190550 A1* | 7/2015 | Nusko | A01N 59/16 424/409 |
| 2016/0081347 A1 | 3/2016 | Niedermeyer | |
| 2016/0082513 A1 | 3/2016 | Niedermeyer | |
| 2016/0082514 A1 | 3/2016 | Niedermeyer | |
| 2016/0083146 A1 | 3/2016 | Han | |
| 2016/0083665 A1 | 3/2016 | Niedermeyer | |
| 2016/0083901 A1 | 3/2016 | Niedermeyer | |
| 2016/0144350 A1 | 10/2016 | Aizenberg | |
| 2016/0298243 A1 | 10/2016 | Tarbet et al. | |
| 2016/0372243 A1 | 12/2016 | Cassignol | |
| 2017/0129975 A1 | 5/2017 | Hallinan et al. | |

FOREIGN PATENT DOCUMENTS

| | | |
|---|---|---|
| CN | 101128550 | 2/2008 |
| CN | 101180372 | 5/2008 |
| CN | 101415644 | 4/2009 |
| CN | 101716684 | 6/2010 |
| CN | 101932752 | 12/2010 |
| CN | 102120619 | 7/2011 |
| CN | 102753628 | 10/2012 |
| CN | 103796946 | 5/2014 |
| CN | 103891558 | 7/2014 |
| CN | 104014811 | 9/2014 |
| DE | 102005044360 | 3/2007 |
| EP | 2140958 | 1/2010 |
| EP | 2559436 | 2/2013 |
| JP | 2008527169 | 7/2008 |
| JP | 2010001528 | 1/2010 |
| KR | 20060021749 | 3/2006 |
| WO | 2006026026 | 3/2006 |
| WO | 2006053225 | 5/2006 |
| WO | 2006062826 | 6/2006 |
| WO | 2008043396 | 4/2008 |
| WO | 2009025955 | 2/2009 |
| WO | 2009044146 | 4/2009 |
| WO | 2009046081 | 4/2009 |
| WO | 2009066011 | 5/2009 |
| WO | 2009091900 | 7/2009 |
| WO | 2011045627 | 4/2011 |
| WO | 2012082364 | 7/2012 |
| WO | 2013006430 | 1/2013 |
| WO | WO2013141879 | 9/2013 |
| WO | 2014066850 | 5/2014 |
| WO | 2014096556 | 6/2014 |
| WO | 2014137352 | 9/2014 |
| WO | 2016007112 | 1/2016 |
| WO | 2016007113 | 1/2016 |

OTHER PUBLICATIONS

Yuteng Wan et al., "Modification of coral-like SnO2 nanostructures with dense TiO2 nanoparticles for a self-cleaning gas sensor", Talanta, vol. 99, pp. 394-403.
U.S. Appl. No. 15/415,562, filed Jun. 20, 2018.
Jacobson, "These six diseases should worry you more than Ebola", Inside Energy Oct. 2014; [online] retrieved on Jan. 29, 2017 from http://www.pbs.org/newshour/updates/six-diseases-actually-worry/; 10 pages.
Pal et al., "Does the Antibacterial Activity of Silver Nanoparticles Depend on the Shape of the Nanoparticle?", Applied and Environmental Microbiology, 2007; 73(6): 1712-1720.
Rawashdeh et al., "Antibacterial Mechanisms of Metallic Nanoparticles: A Review", Dynamic Biochemistry, Process Biotechnology and Molecular Biology 2009 pp. 12-20.
Sahu et al., "Flower Shaped Silver Nanostructures: An Efficient Bacteria Exterminator", A Search for Antibacterial Agents; Chapter 2; [online] retrieved from: http://www.intechopen.com/books/a-search-for-antibacterial-agents; 2007; 73(6): 1712-1720.
U.S. Appl. No. 15/088,863, filed Apr. 1, 2016, Office Action dated Feb. 3, 2017.
U.S. Appl. No. 13/175,708, filed Jul. 1, 2011, Office Action dated Feb. 10, 2017.
U.S. Appl. No. 14/861,442, filed Sep. 22, 2015, Final Office Action dated Feb. 22, 2017.
Santos et al., "Enhancemetn of antibiotic effect via gold:silver-alloy nanoparticles", J. Nanopart Res (2012) 14:859, pp. 1-8.
U.S. Appl. No. 14/861,442, filed Sep. 22, 2105, Office Action dated Sep. 29, 2016.
U.S. Appl. No. 14/864,243, filed Sep. 22, 2015, Office Action dated Nov. 2, 2016.
U.S. Appl. No. 14/861,243, filed Sep. 22, 2015, Final Office Action dated Jul. 26, 2016.
Barcikowski et al., "Generation of nanoparticle colloids by picosecond and femtosecond laser ablations in liquid flow", Appl. Phys. Lett. 91, 083113 (2007).
Jana et al., "Seeding Growth for Size Control of 5-40 nm Diameter Gold Nanoparticles", Langmuir 2001, 17, 6782-6786.
Mafuné et al., "Formation of Stable Platinum Nanoparticles by Laser Ablation in Water", J. Phys. Chem. B 2003, 107, 4218-4223.
Phuoc et al, "Synthesis of Ag-deoionized water nanofluids using multi-beam laser ablation in fluids", Optics and Lasers in Engineering 45 (2007) 1099-1106.
Riabinina et al., "Influence of pressure on the Pt nanoparticle growth modes during pulsed laser ablation", Journal of Applied Physics 108, 034322 (2010, published online Aug. 12, 2010).
Sylvestre et al., "Surface Chemistry of Gold Nanoparticles Produced by Laser Ablation in Aqueous Media", J Phys. Chem. B 2004, 108, 16864-16869.
Sweeney et al., "Rapid Purification and Size Separation of Gold Nanoparticles via Diafiltration", J. Am. Chem. Soc. 2006, 128, 3190-3197 (Published on web Feb. 18, 2006).
U.S. Appl. No. 14/298,594, Jun. 6, 2014, Office Action dated Mar. 21, 2017.
U.S. Appl. No. 15/088,863, filed Apr. 1, 2016, Tarbet et al.
Badawy et al., "Surface Charge-Dependent Toxicity of Silver Nanoparticles", Environ. Sci. Technol. 2011, 45, 283-287.
Chien et al., "Synthesis of nanoparticles: sunlight formation of gold nanodecahedra for ultra-sensitive lead-ion detection", Green Chem., vol. 13, pp. 1162-1166, May 2011.
International Search Report for PCT App. No. PCT/US2012/044907 dated Jan. 13, 2013.
International Search Report for PCT App. No. PCT/US2015/051642 dated Dec. 14, 2015.
International Search Report for PCT App. No. PCT/US2015/051639 dated Dec. 17, 2015.
International Search Report for PCT App. No. PCT/US2015/051640 dated Dec. 17, 2015.
International Search Report for PCT App. No. PCT/US2015/051643 dated Dec. 17, 2015.
International Search Report for PCT App. No. PCT/US2015/051649 dated Dec. 17, 2015.
International Search Report for PCT App. No. PCT/US2015/051646 dated Dec. 18, 2015.
Liu et al., "A novel coral-like porous SnO2 hollow architecture: biomimetic swallowing growth mechanism and enhanced photovoltaic property for dye-sensitized solar cell application", Chem. Commun., vol. 46, pp. 472-474, 2010.
U.S. Appl. No. 13/175,708, filed Jul. 1, 2011, Office Action dated May 30, 2014.
U.S. Appl. No. 13/175,708, filed Jul. 1, 2011, Final Office Action dated Nov. 13, 2014.
U.S. Appl. No. 13/175,708, filed Jul. 1, 2011, Office Action dated Jul. 6, 2015.
U.S. Appl. No. 14/861,243, filed Sep. 22, 2015, Office Action dated Mar. 9, 2016.
U.S. Appl. No. 13/175,708, filed Jul. 1, 2011, Final Office Action dated Mar. 28, 2016.
U.S. Appl. No. 14/861,318, filed Sep. 22, 2015, Office Action dated Apr. 25, 2016.
U.S. Appl. No. 14/861,318, filed Sep. 22, 2015, Notice of Allowance dated May 20, 2016.
U.S. Appl. No. 14/861,318, filed Sep. 22, 2015, Corrected Notice of Allowance dated Jun. 15, 2016.

(56) References Cited

OTHER PUBLICATIONS

U.S. Appl. No. 15/415,562, filed Jan. 25, 2017, Niedermeyer.
Prabhu et al., "Silver nanoparticles: mechanism of antimicrobial action, synthesis, medical applications, and toxicity effects", International Nano Letters, 2012, 2:32, pp. 1-10.
U.S. Appl. No. 14/861,562, filed Sep. 22, 2015, Office Action dated Dec. 7, 2016.
U.S. Appl. No. 14/861,243, filed Sep. 22, 2015, Final Office Action dated Jan. 27, 2017.
U.S. Appl. No. 15/808,088, filed Nov. 9, 2017, Niedermeyer.
U.S. Appl. No. 15/976,447, filed May 10, 2018, Niedermeyer.
U.S. Appl. No. 15/825,912, filed Nov. 29, 2017, Tarbet.
U.S. Appl. No. 16/012,508, filed Jun. 19, 2018, Niedermeyer.
Mycozil, "The Benefits of Colloidal Silver for Toenail Fungus", http://www.nailfungustoenail.com/benefitsofcolloidalsilverfortoenailfungus.html.
Malvern, "The use of the Malvern Zetasizer for the measurement of Zeta Potential", article from the Internet, http://www.malvern.co.alLaboratory/zetaintm.htm> 10 pages, printed on Feb. 12, 2002.
Malvern, "Zeta Potential Theory, Dispersion stability", article from the Internet, http://www.malvern.co.uk/Laboratory/zettheo.htm >, 3 pages, printed on Feb. 12, 2002.
Theodorou et al., "Inhalation of Silver Nanomaterials—Seeing the Risks", International Journal of Molecular Sciences, 2014, 15, 23936-23974.
Hultin, "A Guide to Solvents and Reagents in Introductory Organic Chemistry for students in 2.222", Obtained from https://home.cc.umanitoba.ca/-hultin/chem2220/Support/solvents_and_reagents.pdf on Jan. 25, 2018, originally published Feb. 12, 2002—17 pages.
NOAA Ocean Service Education, "Corals", downloaded from https://oceanservice.noaa.gov/education/kits/corals/coral03_growth.html on Sep. 5, 2017.
Leisure Pro, "Coral Identification: Types of Coral (Part 1—Hard Coral)", downloaded from http://www.leisurepro.com/blog/explorethe-blue/coral-identification-types-of-coral-part-1 on Sep. 2017.
International Coral Reef Initiative, "What are Corals", downloaded from http://www.iciforum.org/about-coral-reefs/what-are-corals on Sep. 5, 2017.
U.S. Appl. No. 14/298,594, Oct. 17, 2017, Office Action cited in U.S. Appl. No. 14/298,594 dated Oct. 17, 2017.
U.S. Appl. No. 14/861,243, Sep. 25, 2017, Office Action cited in U.S. Appl. No. 14/861,243 dated Sep. 25, 2017.
U.S. Appl. No. 14/861,243, Feb. 2, 2018, Office Action cited in U.S. Appl. No. 14/861,243 dated Feb. 2, 2018.
U.S. Appl. No. 14/861,375, Apr. 3, 2018, Office Action cited in U.S. Appl. No. 14/861,375 dated Apr. 3, 2018.
U.S. Appl. No. 14/861,375, Sep. 8, 2017, Office Action cited in U.S. Appl. No. 14/861,375 dated Sep. 8, 2017.
U.S. Appl. No. 14/861,442, Aug. 23, 2017, Office Action cited in U.S. Appl. No. 14/861,442 dated Aug. 23, 2017.
U.S. Appl. No. 14/861,500, Sep. 22, 2017, Office Action cited in U.S. Appl. No. 14/861,500 dated Sep. 22, 2017.
U.S. Appl. No. 14/861,562, Jun. 23, 2017, Office Action cited in U.S. Appl. No. 14/861,562 dated Jun. 23, 2017.
U.S. Appl. No. 15/088,863, Jul. 11, 2017, Office Action cited in U.S. Appl. No. 15/088,863 on Jul. 11, 2017.
U.S. Appl. No. 15/415,562, May 23, 2017, Office Action cited U.S. Appl. No. 15/415,562 dated May 23, 2017.
U.S. Appl. No. 15/415,562, Sep. 5, 2017, Office Action cited in U.S. Appl. No. 15/415,562 dated Sep. 5, 2017.
U.S. Appl. No. 15/415,562, Jan. 31, 2018, Office Action cited in U.S. Appl. No. 15/415,562 dated Jan. 31, 2018.
Thanaa Majied Al-Nori, "Antibacterial activity of Silver and Gold Nanoparticles against *Streptococus, Staphylococcus aureus* and *E. coli*", A1—Mustansiriya J. Sci, vol. 23, No. 3, 2012.
Kewal K. Jain MD, FRACS, FFPM., "The Handbook of Nanomedicine" Humana Press, 2008.
International Search Report cited in PCT/US18/62864 dated Nov. 28, 2018.
Xiang Dongxi, "Study of Silver—nanoparticles on antiviral action", Journal of Dalian Medical University, vol. 31, No. 6, 2009.
U.S. Appl. No. 16/202,078, filed Nov. 27, 2018, Niedermeyer.
Hamm et al. "Ionic conductivity enhancement of sputtered gold nanoparticle-in-ionic liquid electrolytes", J Mater Chem A, 2014; 2(3): 792-803.
He et al. "Ionic liquid and nanoparticle hybrid systems: Emerging applications", 2017. Advances in Colloid and Interface Science, 2017; 244: 54-70.
Nakashima et al. "Preparation of fusion materials based on ionic liquids and cationic gold nanoparticles", Polymer Journal, 2015; 47:171-176.
Choudhury et al. "A highly reversible room-temperature lithium metal battery based on crosslinked hairy nanoparticles", Nature Communications, 2015; DOI: 10.1038/ncomms10101.
Gurevitch et al. "Nanocomposites of Titanium Dioxide and Polystyrene-Poly(ethylene oxide) Block Copolymer as Solid-State Electrolytes for Lithium Metal Batteries", Journal of the Electrochemical Society, 2013; 160(9): A1611-A1617.
Korf et al. "Piperidine tethered nanoparticle-hybrid electrolyte for lithium metal batteries", J Mater. Chem., 2014; 2: 11866-11873.
Lu et al. "Ionic-Liquid-Nanoparticle Hybrid Electrolytes: Applications in Lithium Metal Batteries", Angew. Chem. Int. Ed., 2014; 53: 488-492.
Pan et al. "Hybrid Electrolytes with Controlled Network Structures for Lithium Metal Batteries", Adv. Mater., 2015; 27: 5995-6001.
Tu et al. "Nanoporous Polymer-Ceramic Composite Electrolytes for Lithium Metal Batteries", Adv. Energy Mater., 2014; 4: 1300654.
Daissy Paredes, et al., "Synthesis, characterization, and evaluation of antibacterial effect of Ag nanoparticles against *Escherichia coli* OI57:h7 and methicillin-resistant *Staphylococcus aureus* (Mrsa)", Apr. 3, 2014, International Journal of Nanomedicine, pp. 1717-1729.
Guangnian Xu, et al."Progress in preparation of nano-silver", 2019, Materials Review, vol. 24, No. 11, pp. 139-142.
Xinxia Yue, et al., "Preparation of silver nanoparticles by tea extracts and its application in the antibacterial finishing of cotton fabric", 2014, Shanghai Textile Science & Technology, vol. 42, No. 5, pp. 45-49.
U.S. Appl. No. 15/825,912, filed Jul. 15, 2019, Office Action.
U.S. Appl. No. 16/012,508, filed Dec. 11, 2018, Office Action.
U.S. Appl. No. 16/012,508, filed May 31, 2019. Office Action.

\* cited by examiner

ANTI-CORROSION NANOPARTICLE COMPOSITIONS

CROSS-REFERENCE TO RELATED APPLICATIONS

This application claims the benefit of U.S. Provisional Patent Application No. 62/146,587, filed Apr. 13, 2015, and U.S. Provisional Patent Application No. 62/170,882, filed on Jun. 4, 2015, the disclosures of which are incorporated herein in their entirety.

BACKGROUND

1. Field of the Invention

Disclosed herein are nanoparticle compositions and methods for preventing corrosion of metals and metal alloys.

2. Relevant Technology

The microstructure of metals and metal alloys is composed of grains separated by grain boundaries. Under certain conditions, these grain interfaces can be very reactive, leading to localized corrosive attack at the grain boundary and at areas adjacent to grain boundaries. Such intergranular corrosion can lead to detrimental weakening or failure of metals and alloys, even metals and alloys that are otherwise relatively corrosion-resistant.

Intergranular corrosion can often be a consequence of the fact that impurities and/or segregation effects are elevated at the grain boundaries, leading to areas of reduced corrosion resistance. In many instances, grain boundaries on the surface of a metal or metal alloy material can become anodic and have an electric potential relative to adjacent portions of the surface of the metal or alloy. This effect detrimentally leads to corrosion along the grain boundary, affecting the mechanical properties of the material at the micro level and eventually at the bulk level, and can even cause a loss of material as entire grains become dislodged due to boundary deterioration.

Methods of minimizing this type of corrosion typically require additional heating and quenching steps during manufacturing of the stock material, or require the incorporation of stabilizing elements or strong carbide formers within the metal or metal alloy prior to formation and/or working of the material. While such methods may be beneficial, they are not suitable in many circumstances, require additional materials to be added during manufacturing, and/or require additional manufacturing steps and associated costs.

Coatings, such as paint, can sometimes provide effective corrosion prevention, but particularly in industrial settings, coatings are often impractical, too expensive, or unwanted. For example, in closed-loop heat exchange systems, coatings would impede the flow of heat from one section of the heat exchanger to the other, Additionally, for many pipes or other internal surfaces, applications of paint or other coatings is simply impractical.

In some instances, particularly in closed loop systems, a significant quantity (typically around 2,000 parts per million (ppm)) of a reducing agent such as nitrite ($NO_2^-$) is added to the water to minimize the oxidative capability of the water and also attempt to maintain a pH of the water at approximately pH 11 to help reduce the amount of hydrogen ion ($H^+$) present in the water so as to inhibit or at least minimize hydrogen propagation, which is another cause of corrosion of metallic surfaces.

In pipeline settings where material is flowing through that pipe (as opposed to a closed-loop system) the use of reducing agents is not as applicable. As such, other applications in a pipeline setting include use of more expensive and exotic alloys or difficult and expensive surface treatments for the internal pipe.

Accordingly, there has been and remains a need to find anti-corrosion compositions and methods for preventing corrosion of metals and metal alloys. Such compositions and methods should be able to reliably limit the corrosive effects of intergranular corrosion without requiring excess manufacturing steps or the pre-formation addition of materials.

SUMMARY

Disclosed herein are nanoparticle compositions and application methods for providing anti-corrosion properties to metals and alloys. The anti-corrosion nanoparticle compositions can be applied to a surface of a metal or metal alloy in order to limit intergranular corrosion on the surface of the metal or alloy.

Anti-corrosion nanoparticle compositions can include metal nanoparticles, such as spherical-shaped nanoparticles and/or coral-shaped nanoparticles, which, when applied to a surface of a metal or metal alloy, align with grain boundaries of the metal or metal alloy to reduce or eliminate intergranular corrosion at the grain boundaries and at areas adjacent to the grain boundaries. In some embodiments, anti-corrosion nanoparticle compositions include both spherical-shaped nanoparticles and coral-shaped nanoparticles.

As used herein, nanoparticles are defined as very small particles having a size between about 1 to 100 nm, although under some circumstances, particles of a size somewhat greater than 100 nm can also behave as a whole unit and therefore, in some embodiments, meet the general definition of a nanoparticle.

In certain embodiments, an anti-corrosion nanoparticle composition includes: (1) a carrier configured to be applied to a metal or metal alloy; and (2) a plurality of non-ionic metal nanoparticles suspended in the carrier and selected in size and shape to locate along and/or within grain boundaries of a metal or alloy surface.

In certain embodiments, an anti-corrosion nanoparticle composition includes: (1) a carrier configured to be applied to a surface of a metal or metal alloy; (2) an electrolytic modifier; and (3) a plurality of non-ionic metal nanoparticles suspended in the carrier and selected in size and shape to locate along and/or within grain boundaries of a metal or alloy surface.

In some embodiments, the electrolytic modifier can be a reducing agent, such as one or more of a nitrite, sulfite, or phosphite. The reducing agent may be included to function in conjunction (e.g., synergistically) with the metal nanoparticles to further provide corrosion inhibiting effects. An effective concentration of reducing agent may vary depending on the type and/or composition of the metallic surface being treated. In some embodiments, the reducing agent is included at a concentration of between about 50 to 200 ppm, with higher concentrations also remaining effective, but with the foregoing lower concentrations beneficially providing similar results without the added cost.

An effective concentration of metal nanoparticles may vary somewhat depending on the composition of nanoparticle used and the metallic surface being treated but will typically comprise a minimum concentration of between approximately 0.5 ppm and 15 ppm, or about 0.5 ppm and 5 ppm, with a more preferred range of between approximately 0.5 ppm and 3 ppm, and an even more preferred range of between about 1 ppm and 2 ppm, with higher concentrations (e.g., above about 5 ppm or above about 15 ppm) also remaining effective, but with the foregoing lower concentrations beneficially providing effective results without the added cost.

Application of the anti-corrosion compositions involve adhering or otherwise affixing the nanoparticles onto a metallic surface. This can be accomplished through a variety of methods including simple exposure or soaking of the surface with an anti-corrosion composition for a sufficient time to allow nanoparticle adherence to the metallic surface. In one embodiment, the metallic surface is heated, and an anti-corrosion composition is sprayed onto the surface. The liquid carrier of the anti-corrosion composition is allowed to evaporate, leaving the nanoparticles affixed to the surface. In some embodiments, an electrostatic charge is introduced to the metallic surface to more readily draw the metallic nanoparticles of the anti-corrosion composition onto the metallic surface.

Once the nanoparticles have been effectively affixed on the metallic surface, ongoing treatment of the metallic surface can be accomplished through maintenance of at least an effective concentration of an electrolytic modifier (e.g., a reducing agent) in the environment of the metallic surface being treated. After an initial treatment, as nanoparticles become aligned at grain boundaries of the metallic surface, subsequent treatments can beneficially have significantly reduced quantities of nanoparticles to maintain the same anti-corrosion effect.

In certain embodiments, a method of applying an anti-corrosion nanoparticle composition includes: (1) applying a nanoparticle composition comprised of a carrier and a plurality of non-ionic metal nanoparticles to a surface of a metal or metal alloy, (2) removing the liquid carrier to yield a nanoparticle treated surface in which at least a portion of the nonionic metal nanoparticles locate along and/or within grain boundaries of the metal or metal alloy to provide resistance to corrosion of the metal or alloy.

In certain embodiments, a method of manufacturing an anti-corrosion metal or metal alloy includes: (1) obtaining a metal or metal alloy, (2) applying a nanoparticle composition comprised of a liquid carrier and a plurality of non-ionic metal nanoparticles to a surface of the metal or alloy, and (3) removing the liquid carrier to yield a nanoparticle treated surface in which at least a portion of the nonionic metal nanoparticles locate along and/or within grain boundaries of the metal or alloy to provide resistance to corrosion of the metal or alloy.

In some embodiments, metal nanoparticles can comprise spherical-shaped metal nanoparticles and/or coral-shaped metal nanoparticles. In some embodiments the coral-shaped metal nanoparticles can be used together with spherical-shaped metal nanoparticles to help carry and/or potentiate the spherical-shaped metal nanoparticles.

In some embodiments, nanoparticle compositions (including spherical-shaped, coral-shaped, or multi-component nanoparticle compositions) include a carrier capable of holding the nanoparticles in solution while still maintaining the functionality of the nanoparticles.

In preferred embodiments, the metal nanoparticles are formed from elements or alloys that are not readily corroded in the environment in which they will be used. In some embodiments, at least a portion of the metal nanoparticles are antimony (Sb) nanoparticles that function to preclude hydrogen propagation and thereby further inhibit the mechanisms known to be part of the corrosion process.

These and other advantages and features of the invention will be set forth in part in the description which follows, and in part will become apparent to those skilled in the art upon examination of the following or may be learned by practice of the invention.

DETAILED DESCRIPTION OF THE PREFERRED EMBODIMENTS

Disclosed herein are nanoparticle compositions for providing anti-corrosion properties to metals and/or metal alloys. Also disclosed herein are methods for applying anti-corrosion nanoparticle compositions to metals or metal alloys in order to provide corrosion resistance to the metal or metal alloy, and methods for manufacturing a metal or alloy with a corrosion resistant surface.

Surprisingly, it has now been found that by selecting nanoparticles having the appropriate size distribution and/or surface properties, and suspending the nanoparticles in a suitable carrier to form an anti-corrosion nanoparticle composition, applying the composition to a metal or metal alloy leads to enhanced corrosion resistance of the metal or alloy.

Nanoparticle Configurations

In some embodiments, the metal nanoparticles may comprise or consist essentially of nonionic, ground state metal nanoparticles. Examples include spherical-shaped metal nanoparticles, coral-shaped metal nanoparticles, or a blend/ combination of spherical-shaped metal nanoparticles and coral-shaped metal nanoparticles.

In some embodiments, metal nanoparticles useful for making nanoparticle compositions comprise spherical nanoparticles, preferably spherical-shaped metal nanoparticles having a solid core. The term "spherical-shaped metal nanoparticles" refers to nanoparticles that are made from one or more metals, preferably nonionic, ground state metals, having only internal bond angles and no external edges or bond angles. In this way, the spherical nanoparticles are highly resistant to ionization, highly stable, and highly resistance to agglomeration. Such nanoparticles can exhibit a high absolute value ξ-potential (positive or negative), which permits the spherical nanoparticles to remain dispersed within a polar solvent without a surfactant, which is a surprising and unexpected result.

In some embodiments, spherical-shaped metal nanoparticles can have a diameter of about 40 nm or less, about 35 nm or less, about 30 nm or less, about 25 nm or less, about 20 nm or less, about 15 nm or less, about 10 nm or less, about 7.5 nm or less, or about 5 nm or less. In some embodiments, nanoparticles are no smaller than about 1 nm.

In some embodiments, spherical-shaped nanoparticles can have a particle size distribution such that at least 99% of the nanoparticles have a diameter within 30% of the mean diameter of the nanoparticles, or within 20% of the mean diameter, or within 10% of the mean diameter. In some embodiments, spherical-shaped nanoparticles can have a mean particle size and at least 99% of the nanoparticles have a particle size that is within ±3 nm of the mean diameter, ±2 nm of the mean diameter, or ±1 nm of the mean diameter. In some embodiments, spherical-shaped nanoparticles can have a ξ-potential with an absolute value (positive or negative) of at least 10 mV, preferably at least about 15 mV, more preferably at least about 20 mV, even more preferably at least about 25 mV, and most preferably at least about 30 mV.

Figure 1A:
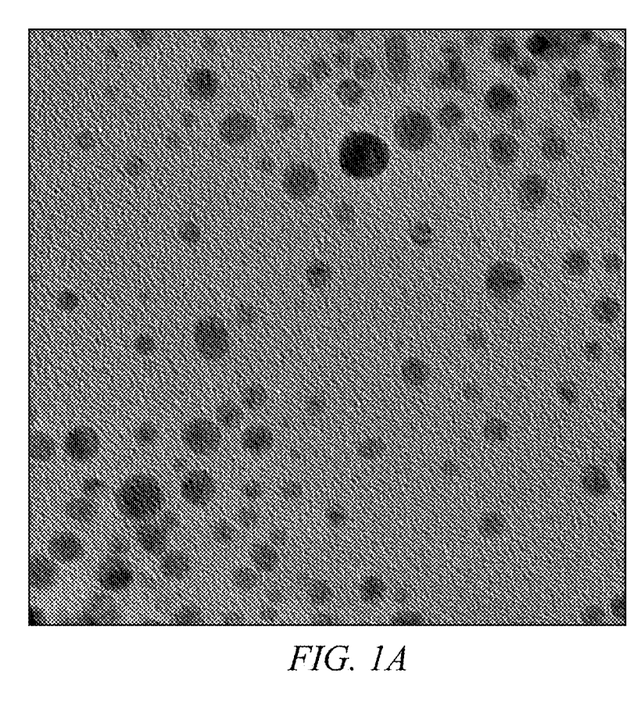
FIG. 1A is a scanning transmission electron microscope (STEM) image of exemplary spherical-shaped gold nanoparticles having substantially uniform size of about 14 nm, narrow particle size distribution, and showing no agglomeration of particles, the nanoparticles having use for making anti-corrosion nanoparticle compositions.
Figure 1B:
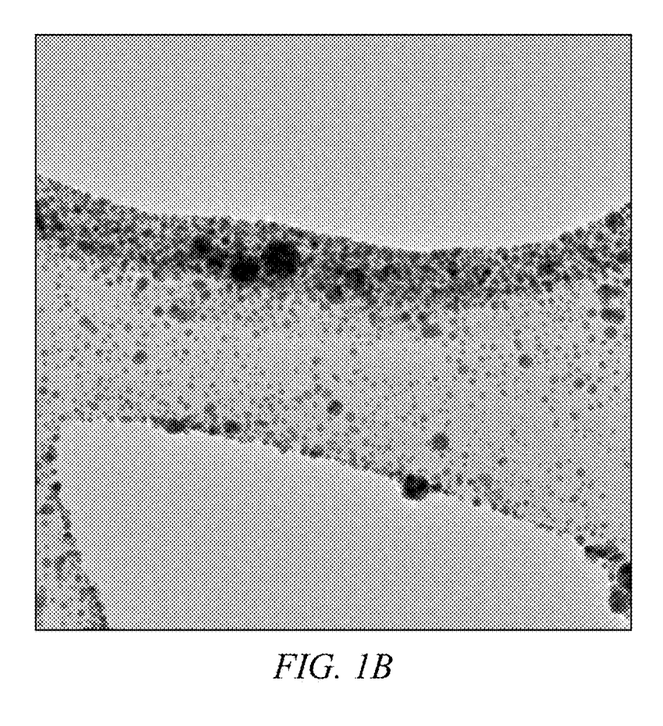
FIGS. 1B and 1C are scanning transmission electron microscope (STEM) images of exemplary spherical-shaped gold nanoparticles on a carbon lattice structure, the nanoparticles having substantially uniform size of about 14 nm, narrow particle size distribution, and showing no agglomeration of particles, the nanoparticles having use for making anti-corrosion nanoparticle compositions.
Figure 1C:
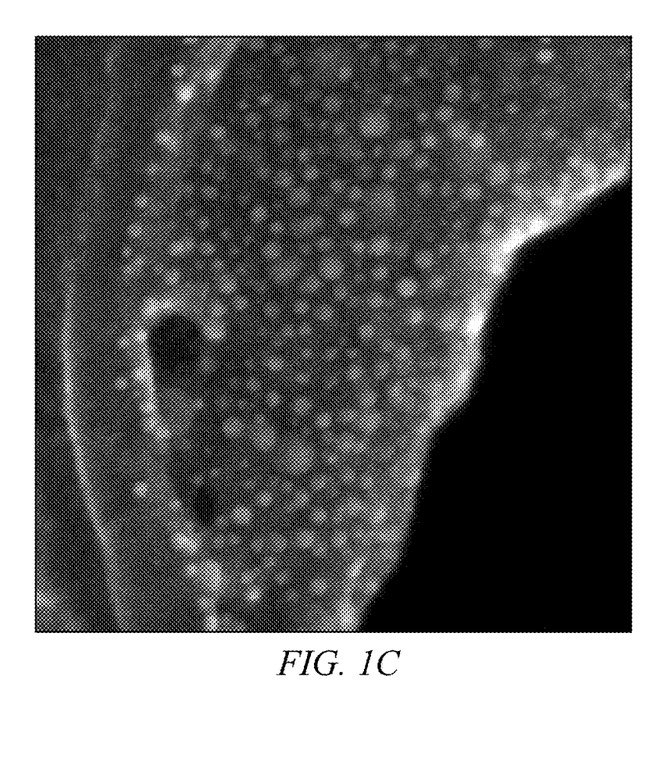

Examples of methods and systems for manufacturing spherical-shaped nanoparticles are disclosed in U.S. Pat. Pub. No. 2013/0001833 to William Niedermeyer, which is incorporated herein by reference. FIGS. 1A-1C show scanning transmission electron microscope (STEM) images of exemplary spherical-shaped nanoparticles made using the methods and systems described by U.S. Pat. Pub. No. 2013/0001833. The illustrated nanoparticles are spherical-shaped gold nanoparticles of substantially uniform size, with a mean diameter of about 14 nm and a narrow particle size distribution. In some embodiments, spherical-shaped nanoparticles can have a solid core rather than being hollow, as is the case with conventional metal nanoparticles, which are usually formed on the surfaces of non-metallic seed nanoparticles (e.g., silica), which are thereafter removed to yield hollow nanospheres.

In some embodiments, nonionic metal nanoparticles useful for making nanoparticle compositions may also comprise coral-shaped nanoparticles. The term "coral-shaped metal nanoparticles" refers to nanoparticles that are made from one or more metals, preferably nonionic, ground state metals having a non-uniform cross section and a globular structure formed by multiple, non-linear strands joined together without right angles. Similar to spherical-shaped nanoparticles, coral-shaped nanoparticles may have only internal bond angles and no external edges or bond angles. In this way, coral-shaped nanoparticles can be highly resistant to ionization, highly stable, and highly resistance to agglomeration. Such coral-shaped nanoparticles can exhibit a high absolute value ξ-potential (positive or negative), which permits the coral-shaped nanoparticles to remain dispersed within a polar solvent without a surfactant, which is a surprising and expected result.

In some embodiments, coral-shaped nanoparticles can have lengths ranging from about 15 nm to about 100 nm, or about 25 nm to about 95 nm, or about 40 nm to about 90 nm, or about 60 nm to about 85 nm, or about 70 nm to about 80 nm. In some embodiments, coral-shaped nanoparticles can have a particle size distribution such that at least 99% of the nanoparticles have a length within 30% of the mean length, or within 20% of the mean length, or within 10% of the mean length. In some embodiments, coral-shaped nanoparticles can have a ξ-potential with an absolute value (positive or negative) of at least 10 mV, preferably at least about 15 mV, more preferably at least about 20 mV, even more preferably at least about 25 mV, and most preferably at least about 30 mV.

Figure 2A:
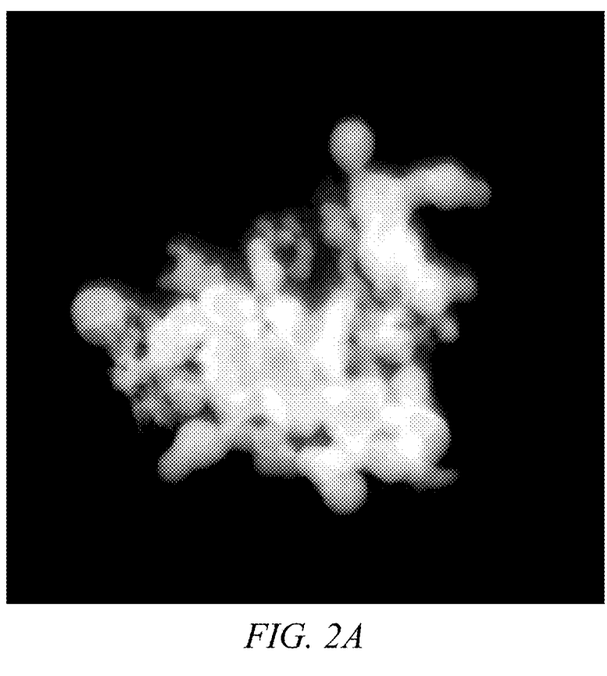
FIG. 2A is a scanning transmission electron microscope (STEM) image of an exemplary coral-shaped gold nanoparticle having a length of about 25 nm, showing no right angles or facets and having smooth curves at all intersections, the nanoparticle having use for making anti-corrosion nanoparticle compositions.
Figure 2B:
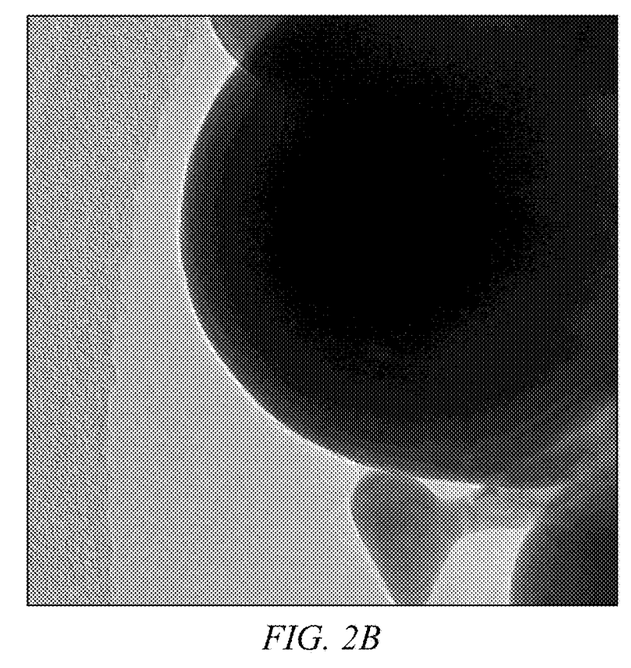
FIGS. 2B and 2C are scanning transmission electron microscope (STEM) images showing zoomed in views of an exemplary coral-shaped gold nanoparticles having a length of about 25 nm, showing no right angles or facets and having smooth curves at all intersections, also illustrating differing atomic structure at the edges than in the center of the particle showing shorter bond lengths to accomplish the exhibited smoothness, the nanoparticles having use for making anti-corrosion nanoparticle compositions.
Figure 2C:
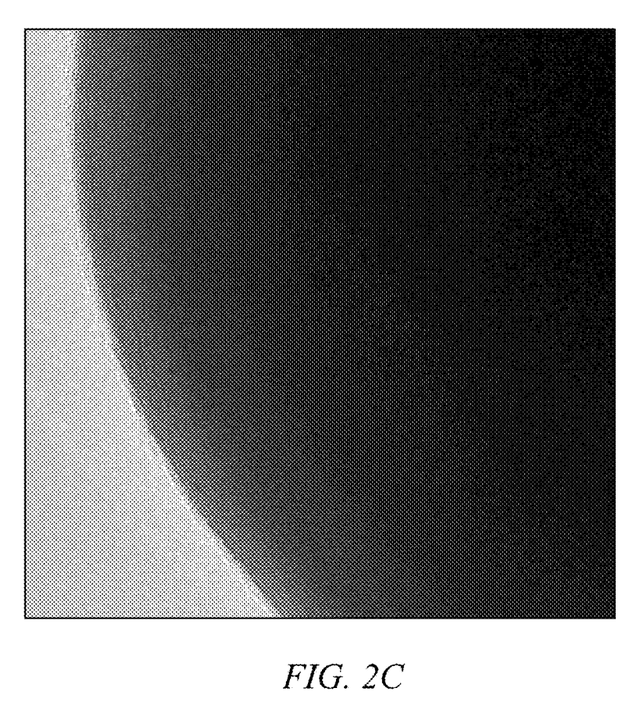

Examples of methods and systems for manufacturing coral-shaped nanoparticles are disclosed in U.S. Pat. Pub. No. 2016/0082514, to William Niedermeyer, which is incorporated herein by this reference. FIGS. 2A-2C are scanning transmission electron microscope (STEM) images of exemplary coral-shaped metal nanoparticles made using the methods and systems of the Niedermeyer Application. The illustrated nanoparticles are coral-shaped gold nanoparticles having a length of about 25 nm and showing no right angles or facets with smooth curves at all intersections. As shown in FIGS. 2B and 2C in particular, the illustrated nanoparticles exhibit differing atomic structure at the edges relative to the center of the particle, with shorter bond lengths at the edges providing the exhibited particles smoothness.

The metal nanoparticles, including spherical-shaped and coral-shaped nanoparticles, may comprise any desired metal, mixture of metals, or metal alloy, including at least one of silver, gold, platinum, palladium, rhodium, osmium, ruthenium, rhodium, rhenium, molybdenum, copper, iron, nickel, tin, beryllium, cobalt, antimony, chromium, manganese, zirconium, tin, zinc, tungsten, titanium, vanadium, lanthanum, cerium, heterogeneous mixtures thereof, or alloys thereof.

In preferred embodiments, the nanoparticles comprise precious metals such as gold, silver, platinum, and palladium. In some embodiments the nanoparticles will be made from alloys of the precious metals that are combined with antimony, bismuth, lead, or other elements with the capability to prevent or inhibit hydrogen propagation. In some embodiments, the nanoparticles are formed from stainless steels, austenite nickel-chromium alloys (e.g., sold under the trade name Inconel®) and/or nickel-based alloys (e.g., nickel-copper-iron-manganese alloys such as those sold under the trade name Monel®).

Multi-Component Nanoparticle Compositions

In some embodiments, coral-shaped metal nanoparticles can be used in conjunction with spherical-shaped metal nanoparticles. In general, spherical-shaped metal nanoparticles can be smaller than coral-shaped metal nanoparticles and in this way can provide very high surface area for catalyzing desired reactions or providing other desired benefits. On the other hand, the generally larger coral-shaped nanoparticles can exhibit higher surface area per unit mass compared to spherical-shaped nanoparticles because coral-shaped nanoparticles have internal spaces and surfaces rather than a solid core and only an external surface. In some cases, providing nanoparticle compositions containing both spherical-shaped and coral-shaped nanoparticles can provide synergistic results. For example, coral-shaped nanoparticles can help carry and/or potentiate the activity of spherical-shaped nanoparticles in addition to providing their own unique benefits.

In some embodiments, the nanoparticle compositions may include both spherical-shaped and coral-shaped nanoparticles. In some embodiments, the mass ratio of spherical-shaped nanoparticles to coral-shaped nanoparticles in the nanoparticle composition can be in a range of about 1:1 to about 50:1, or about 2.5:1 to about 25:1, or about 5:1 to about 20:1, or about 7.5:1 to about 15:1, or about 9:1 to about 11:1, or about 10:1. The particle number ratio of spherical-shaped nanoparticles to coral-shaped nanoparticles in the nanoparticle composition can be in a range of about 10:1 to about 500:1, or about 25:1 to about 250:1, or about 50:1 to about 200:1, or about 75:1 to about 150:1, or about 90:1 to about 110:1, or about 100:1.

In some embodiments, the compositions will include at least one spherical-shaped nanoparticle component and at least one larger coral-shaped nanoparticle component. In these embodiments, the at least one selected spherical-shaped nanoparticle component will be present in the solution in a range of between about 1 ppm and about 15 ppm (e.g., at least 1 ppm and at mostly ppm) and more particularly in the range of between about 1 ppm and about 5 ppm (e.g., at least 1 ppm and at most 5 ppm). Additionally, in some embodiments, the larger coral-shaped nanoparticles will be present in the solution in a range of between about 1 ppm and about 5 ppm (e.g., at least 1 ppm and at most 5 ppm) and more particularly between about 1 ppm and about 3 ppm (e.g., at least 1 ppm and at most 3 ppm). It should be understood that the upper concentration is not restricted as much by efficacy, but more by product formulation cost. Thus, in other embodiments, the spherical-shaped nanoparticle component may present at a concentration above 5 ppm and/or the coral-shaped nanoparticle component may be present at a concentration above 3 ppm.

Some embodiments may include a stabilizing agent. For example, there are times when it is desirable to have different specifically sized nanoparticles within the same solution to take advantage of each of the different properties and effects of the different particles. A stabilizing agent may therefore be included to enhance the overall long-term stability of these particles to equalize or diminish the effects of unequal forces exerted on the various particles, minimizing or preventing agglomeration of the particles. Agglomeration effects may become even more pronounced when a solution is either heated or cooled significantly above or below standard room temperature conditions.

The stabilizing agent may itself be beneficial for use in anti-corrosion applications. Examples of stabilizing agents include alcohols (e.g., ethanol, propanol, butanol, etc.), as alcohols have been observed to effectively maintain nanoparticles of different sizes and different shapes within a given solution. In addition, amine compounds such as mono-, di-, and tri-ethanol amine may be used as stabilizing agent or part thereof. A stabilizing agent may additionally function as a carrier (and vice versa), as described in more detail below, or may be added as a separate component (e.g., in addition to a carrier) to a nanoparticle composition.

Corrosion Resistance

Figure 3:
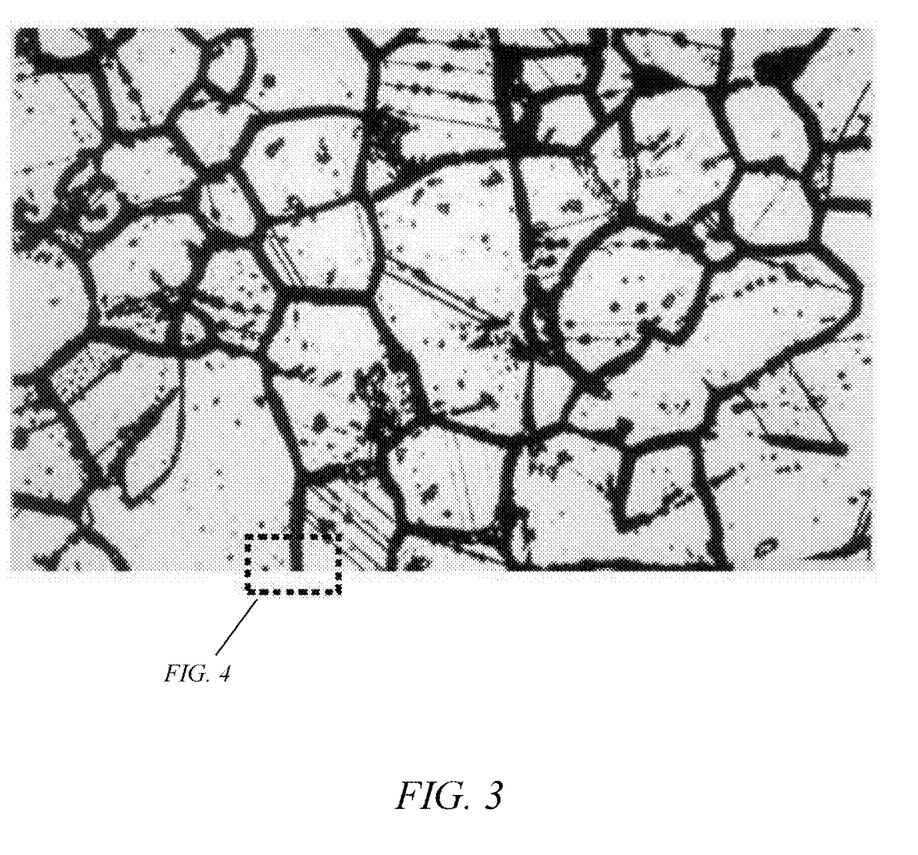
FIG. 3 schematically illustrates a metal or metal alloy surface having intergranular spaces.
Figure 4:
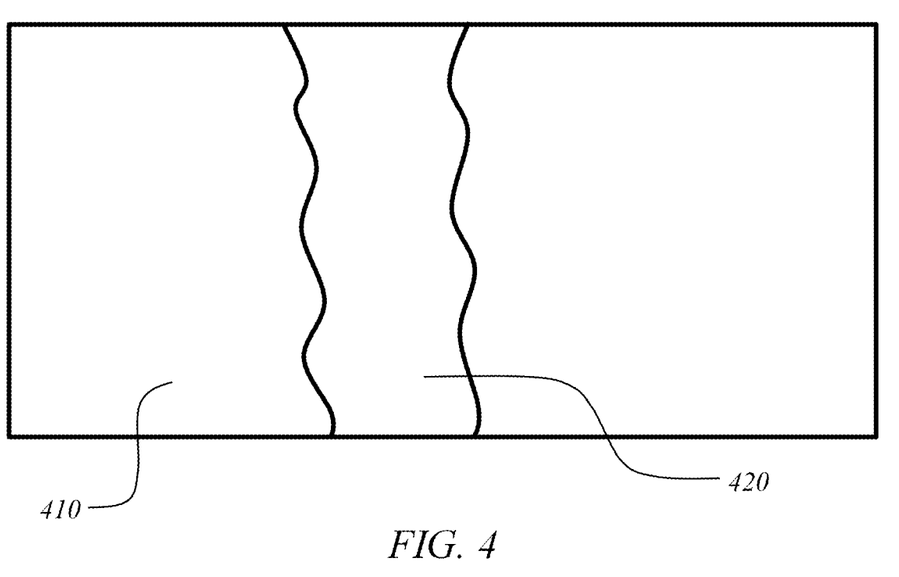
FIG. 4 schematically illustrates a close up view of a section of the metal or metal alloy surface shown in FIG. 3.

FIG. 3 schematically illustrates a surface of a metal or metal alloy having a number of intergranular junctions. Such grain boundaries of the metal or metal alloy are subject to corrosive attack, resulting in localized corrosion between grains of the metal or alloy. FIG. 4 schematically illustrates a close up view of a grain boundary of the surface shown in FIG. 3. FIG. 4 illustrates the grain surface 410 and the intergranular space 420 located between adjacent grains at the grain boundary.

Figure 5:
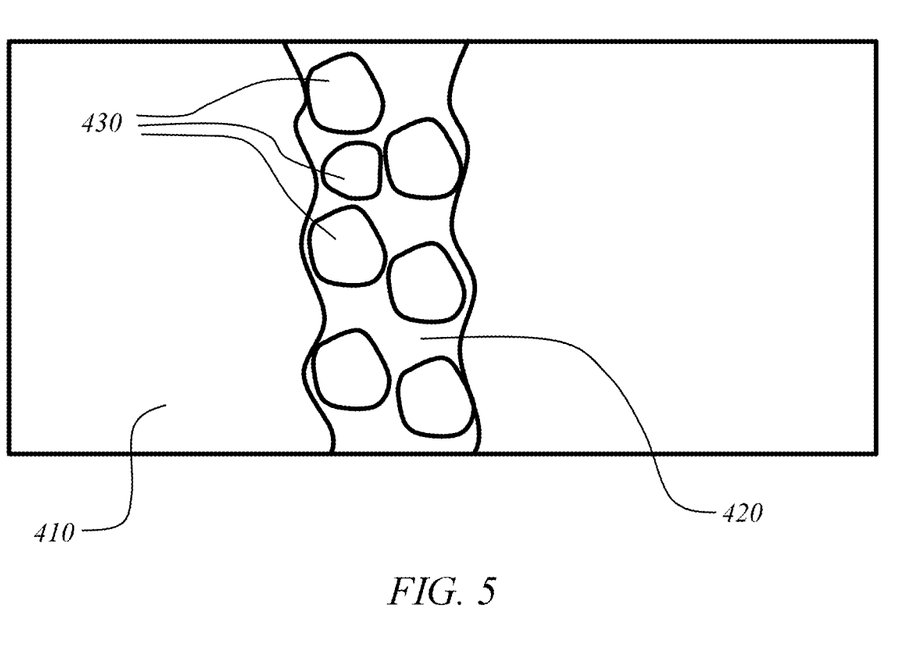
FIG. 5 schematically illustrates the section shown in FIG. 4 after application of an anti-corrosion composition, with a plurality of nanoparticles locating at the grain boundary to reduce or prevent intergranular corrosion.

As explained above, intergranular corrosion can occur when localized impurities or segregation effects lead to the formation of galvanic couples across the grain boundary, resulting in detrimental oxidation, hydrogen propagation, and other undesirable corrosive effects. As illustrated in FIG. 5, when an anti-corrosion composition of the present invention is applied to the metal or alloy, nanoparticles 430 contained in the composition can locate at the grain boundary, including between grains 410 in the intergranular space 420.

Surprisingly, it has been found that application of an anti-corrosion composition of the present invention provides corrosion resistance to the treated metal or alloy. Without being bound to a particular theory, it is theorized that when nanoparticles 430 locate at the grain boundary, the localized galvanic couplings driving the intergranular corrosion are disrupted and/or the localized electric potentials at or near the grain boundaries are equilibrated.

Carriers

The anti-corrosion composition can also include a carrier for delivering the metal nanoparticles to the metal or metal alloy to be treated for corrosion resistance. The carrier can be a liquid, gel, or solid. The nanoparticles can be readily incorporated into any number of carriers that may then become the basis for a wide array of products including sprays, coatings, dry fog solutions, soaking solution, and wiping solutions, for example.

Some carriers may be more suitable than others depending on the metal or alloy to be treated and/or depending on the desired method of application. For example, the volatility of the carrier may be selected to allow for quick evaporation of the carrier and relatively rapid deposition of the nanoparticles onto the metal or alloy to be treated.

Additionally, or alternatively, a liquid carrier may be selected to provide a desired surface tension when applied to a metal or metal alloy surface in order to provide a desired wetting effect. For example, a liquid carrier may be selected in order to provide a high degree of wetting when applied to the surface of a metal or alloy, such as a carrier that forms a contact angle of between about 0 degrees and about 90 degrees, or between about 0 degrees and about 60 degrees, or between about 0 degrees and about 45 degrees when applied to the surface to be treated. In some embodiments, such carriers may include alcohols or alcohol/water mixtures.

Additional examples of carriers that can be used to formulate anti-corrosion compositions in addition or alternative to those disclosed herein include, but are not limited to, alcohols (e.g., methanol, ethanol, isopropyl alcohol, glycols, other lower alcohols), ketones, esters, ethers, and other organic solvents.

Gels known in the art can be used as carriers, such as gels containing one or more of the foregoing liquid components together with known gelling agents. As compared to a liquid carrier, an anti-corrosion composition with a gel or gel-like carrier can be more easily applied in certain situations. For example, when a metal or metal alloy surface to be treated is not in a position that lends itself to liquid application, or where a liquid carrier may not offer the desired application coverage (e.g., when the target surface to be treated is facing down and a liquid carrier lacks the viscosity to maintain sufficient duration of contact with the surface).

Additional components may be added to the anti-corrosion nanoparticle composition. Such additives can be selected to provide additional desired properties to the composition and/or to enhance or alter properties of the carrier. For example, additives may be added to modify surface tension or viscosity, to improve the stability of the composition, and/or to protect from ultraviolet radiation. Additives may also include thickeners, emulsifiers, adhesion promoters, and the like.

Electrolytic Modifiers & Reducing Agents

In some embodiments, electrolytic modifiers can be added to the composition in order to modify the electrolytic environment in which the nanoparticles reside and/or to function as a reducing agent to assist in preventing oxidation of the metallic surface to which the composition is applied. In some embodiments, such electrolytic modifiers can be added to alter the adsorption and/or adherence of nanoparticles to the grain boundaries of the metal or alloy to which the anti-corrosion composition is applied. In preferred embodiments, an electrolytic modifier is added in order to increase the adsorption and/or adherence of nanoparticles to areas along or within the grain boundaries of the metal or alloy such that a higher proportion of nanoparticles within the anti-corrosion composition locate at these areas and/or a higher proportion remain at these areas after application.

In some embodiments, electrolytic modifiers can be used to modify the surface properties of the nanoparticles, thereby altering the interactions of the nanoparticles with the surface environment of the metal or alloy when applied to the metal or alloy. For example, one or more electrolytic modifiers may be added in order to increase the amount and/or strength of electronic coupling of nanoparticles to the areas of the metal or alloy surface along and/or within the grain boundaries.

Electrolytic modifiers can include, for example, electrolytes and polyelectrolytes. For example, one or more salts can be added to the anti-corrosion composition. Non-limiting examples of salts include cations such as sodium ($Na^+$), potassium ($K^+$), magnesium ($Mg^{+2}$), calcium ($Ca^{+2}$), ammonium ($NH_4^+$), iron (e.g., ferrous (Fe(II) or ferric (Fe(III)), copper (e.g., cuprous (Cu(I) or Cupric Cu(II)), zinc, nickel, etc., and can include anions of nitrite ($NO_2^-$), phosphate ($PO_4^{-3}$), sulfate ($SO_4^{-2}$), carbonate ($CO_3^{-2}$), nitrate ($NO_3^-$), chloride ($Cl^-$), and the like. Suitable polyelectroloytes include, for example, polystyrene sulfonate, polymethacrylic acid, polyallylamine, polysodium acrylate, polyvinyl amine, polyethylimine, polyphosphates, and other polyelectrolytes and polyampholytes.

Electrolytic modifiers can also include acids (e.g., hydrochloric, nitric, acetic, sulfuric, citric, carbonic, phosphoric, oxalic, etc.) or bases (e.g., sodium hydroxide, sodium bicarbonate, calcium hydroxide, potassium hydroxide, ammonia, etc.).

In some preferred embodiments, one or more electrolytic modifiers can function as reducing agents to assist in preventing oxidation of the metallic surface to which the composition is applied. For example, one or more of a nitrite, sulfite, phosphite or polyphosphate may be added in a range of about 50 ppm and 200 ppm. Although higher concentrations are also effective, the foregoing concentration ranges have shown to be effective and beneficially provide effective results without the need for the additional expense of higher concentrations. An example of a suitable polyphosphate is sodium hexametaphosphate.

In embodiments in which a reducing agent is included (e.g., to provide a desired synergistic anti-corrosion effect with the nanoparticles), anti-corrosion effects may be maintained even while subsequent treatments can reduce the concentration of nanoparticles applied. For example, in a closed-loop systems such as an evaporative-loop cooling tower system, fresh make-up water being added to the system may still contain between 50 ppm and 200 ppm of reducing agent, but the concentration of nanoparticles can be reduced to less than 0.5 ppm or less than 0.1 ppm, or even eliminated entirely while still maintaining the same level of anti-corrosion activity.

In another example, in a pipeline application, once the interior surface of the pipe has been treated such that the nanoparticles are affixed to that interior pipe surface, maintenance of that interior pipe surface can be accomplished with limited or no additional application of nanoparticles. In some circumstances, an effective concentration of reducing agent may be maintained within the aqueous phase of material flowing through that pipeline.

In another example, in captive water systems, where the corrosion is caused by water that is not flowing or otherwise being evaporated such as bilge water in the bottom of ships, a sufficient concentration of nanoparticles (and optionally a reducing agent) may be added to the captive water to create an anti-corrosion composition, and no further addition of nanoparticles will be typically required.

Parameters

Various parameters of the anti-corrosion nanoparticle composition can be varied according to a desired anti-corrosion application. Parameters include, for example, nanoparticle configuration (e.g., particle shape, particle size and size distribution, particle type(s) and blend ratios), nanoparticle concentration, and carrier features (e.g., viscosity, volatility, pH, electrical conductivity, presence of additives, and presence of electrolytic modifiers such as reducing agents). Each of these parameters and sub-parameters can be varied based on a selected application of the anti-corrosion composition. Influencing factors can include, for example, the type of metal or alloy to be treated, the desired method of application (e.g., spraying, coating, soaking), and/or the level of intergranular corrosion exhibited by the material to be treated.

For example, an anti-corrosion composition can be formulated, at least in part, based on a measured or expected size and/or shape of intergranular spaces. In such embodiments, nanoparticle sizes can be selected such that, upon application of the anti-corrosion composition to the metal or metal alloy, the nanoparticles fit between the grains of the material and more effectively disrupt the galvanic coupling driving intergranular corrosion or putting the material at risk of intergranular corrosion.

In another example, an anti-corrosion composition can be formulated, at least in part, based on comparing measured or expected surface properties of the nanoparticles with measured or expected surface properties of the targeted grain boundaries (e.g., average electrical potential across grain boundaries). In such embodiments, nanoparticles and/or electrolytic modifiers may be selected so as to provide the nanoparticles with surface properties that enable greater electronic coupling of the nanoparticles at the grain boundary and/or between grains of the material to be treated.

In some embodiments, a nanoparticle composition can be formulated so that the metal nanoparticles are included in a concentration so that a measured quantity of the nanoparticle composition, when applied onto the surface of a metal or metal alloy, will provide a predetermined concentration or quantity of metal nanoparticles and/or will provide ongoing anti-corrosion efficacy for an extended period of time. The nanoparticle composition can have a higher concentration of nanoparticles that become diluted when mixed with other liquids applied to the treatment surface, for example.

Depending on the metal or alloy surface to be treated, the nature of the nanoparticles being added, and the type of carrier being used, the nanoparticle composition may contain about 0.5 ppm to about 100 ppm of metal nanoparticles by weight, or about 1 ppm to about 50 ppm, or about 2 ppm to about 25 ppm, or about 3 ppm to about 20 ppm metal nanoparticles by weight. In other embodiments, nanoparticle compositions may contain about 0.5 ppm and 15 ppm, or about 0.5 ppm and 5 ppm, with a more preferred range of between approximately 0.5 ppm and 3 ppm, and an even more preferred range of between about 1 ppm and 2 ppm.

Methods of Application

In certain embodiments, methods for applying an anti-corrosion composition includes soaking, spraying, or otherwise exposing the metallic surface for a time sufficient to allow nanoparticle adherence to the surface. It has been observed that under typical temperature conditions (e.g., about room temperature), adherence of the nanoparticles can be accomplished in about 4 hours or less.

In some embodiments, adherence of the nanoparticles to the metal surface is accelerated and/or accentuated by heating the metallic surface (to a temperature of between 120 and 160° F., for example), and applying an anti-corrosion composition onto the surface (e.g., as a spray or mist) sufficient to thoroughly wet the surface and then allow the liquid of the anti-corrosion composition to rapidly evaporate, thereby leaving the nanoparticles affixed to the surface.

In some embodiment adherence of the nanoparticles to the metal surface can be accelerated and/or accentuated by the introduction of an electrostatic charge to the metallic surface. By way of example, it has been observed that under typical temperature conditions, adherence of the nanoparticles utilizing an electrostatic charge to the metallic surface can be accomplished in as little as approximately 30 minutes or less.

In certain embodiments, a method of applying an anti-corrosion nanoparticle composition includes: (1) applying a nanoparticle composition comprised of a carrier and a plurality of non-ionic metal nanoparticles to a surface of a metal or alloy, (2) removing the liquid carrier to yield a nanoparticle treated surface in which at least a portion of the nonionic metal nanoparticles locate along and/or within grain boundaries of the metal or alloy to provide resistance to corrosion of the metal or alloy. Removal of the liquid carrier may include removal as a liquid or vapor.

In some embodiments, anti-corrosion nanoparticle compositions of the present disclosure can be applied to metals and/or alloys. For example, anti-corrosion compositions can be applied to metals and/or alloys known to be at risk for intergranular corrosion, or expected to undergo intergranular corrosion based on factors such as material type, prior manufacturing processes (e.g., extruding and/or intensive working), and/or expected use of the metal or alloy.

In some embodiments, an anti-corrosion composition can be applied to an austenitic stainless steel including chromium or to nickel alloys in which chromium has been added. Such steels/alloys are often susceptible to intergranular corrosion caused by chromium depletion at the grain boundaries as a result of precipitation of chromium carbides. High carbon steel may also benefit from the anti-corrosion composition as result of possible alteration of grain boundaries by carbon. Anti-corrosion compositions can also be applied to metals or alloys known to be susceptible to knifeline attack, such as 347 stainless steel and other stainless steels including niobium.

Anti-corrosion compositions of the present disclosure can also be applied to aluminum or titanium metals and to aluminum and titanium based alloys. For example, anti-corrosion compositions can be applied to aluminum-based and titanium-based materials with grain boundaries susceptible to intergranular corrosion caused by segregation of iron impurities and concentration at the grain boundaries. Other embodiments include application of an anti-corrosion composition to aluminum alloys having levels of copper which can promote the formation of localized galvanic couples at the grain boundaries of the alloy. Other embodiments include application of an anti-corrosion composition to brass, such as brass having elevated zinc content at or near the grain boundaries.

Anti-corrosion compositions can also be applied to closed-circuit applications, such as heat-exchangers, evaporative coolers, etc., to open circuit applications such as pipelines, and to stagnant fluid applications such as bilge areas.

In some embodiments, the anti-corrosion treatment is repeated one or more times, or a subsequent, different treatment or combination of treatments is subsequently applied.

Methods of Manufacture

In certain embodiments, a method of manufacturing an anti-corrosion metal or alloy includes: (1) obtaining a metal or metal alloy, (2) applying a nanoparticle composition comprised of a liquid carrier and a plurality of non-ionic metal nanoparticles to a surface of the metal or metal alloy, and (3) removing the liquid carrier to yield a nanoparticle treated surface in which at least a portion of the nonionic metal nanoparticles locate along and/or within grain boundaries of the metal or alloy to provide resistance to corrosion of the metal or alloy.

In certain embodiments, a method of manufacturing an anti-corrosion metal or alloy includes: (1) obtaining a metal or metal alloy, (2) obtaining a nanoparticle composition comprised of a carrier and a plurality of non-ionic metal nanoparticles with the metal or alloy, (3) integrating the nanoparticle composition with the metal or alloy prior to or during a manufacturing process of the metal or alloy such that at least a portion of the nonionic metal nanoparticles locate along and/or within grain boundaries of the metal or alloy to provide resistance to corrosion of the metal or alloy.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

EXAMPLES

Example 1

A corrosion inhibiting composition containing distilled deionized water adjusted to pH 6.0 with sulfuric acid, 100 ppm sodium nitrite and 1 ppm Ag nanoparticles made using laser ablation with an average size of the Ag nanoparticles being approximately 10 nm was provided into which a mild steel coupon was placed. No measurable corrosion by weight loss or visible corrosion observed for 3 years.

Example 2

A corrosion inhibiting composition containing distilled deionized water adjusted to pH 6.0 with sulfuric acid, 100 ppm sodium nitrite and 1 ppm Au nanoparticles made using laser ablation with an average size of the Au nanoparticles being between approximately 40-60 nm was provided into which a mild steel coupon was placed. No measurable corrosion by weight loss or visible corrosion observed for 3 years.

Example 3

A corrosion inhibiting composition containing distilled deionized water adjusted to pH 6.0 with sulfuric acid, 100 ppm sodium nitrite and 0.5 ppm of Ag nanoparticles made using laser ablation with an average size of the Ag nanoparticles being approximately 10 nm and 0.5 ppm of Au nanoparticles made using laser ablation with an average size of the Au nanoparticles being between approximately 40-60 nm (for a total of 1.0 ppm of total nanoparticle concentration) was provided into which a mild steel coupon was placed. No measurable corrosion by weight loss or visible corrosion observed for 3 years.

Example 4

A corrosion inhibiting composition containing distilled deionized water adjusted to pH 3.0 with acetic acid, 100 ppm sodium nitrite and 2.0 ppm of AgSb alloyed nanoparticles made using laser ablation with an average size of the nanoparticles being between approximately 20-25 nm was provided into which a mild steel coupon was placed. No measurable corrosion by weight loss or visible corrosion observed for 1 month.

Example 5

A corrosion inhibiting composition containing distilled deionized water adjusted to pH 6.0 with sulfuric acid, 50 ppm sodium nitrite and 2.0 ppm of AgSb alloy nanoparticles made using laser ablation with an average size of the nanoparticles being between approximately 20-25 nm was provided into which a mild steel coupon was placed. No measurable corrosion by weight loss or visible corrosion observed for 6 month2.

Example 6

A corrosion inhibiting composition containing distilled deionized water adjusted to pH 6.0 with sulfuric acid, 100 ppm sodium nitrite and 1 ppm Au nanoparticles made using laser ablation with an average size of the Au nanoparticles being between approximately 40-60 nm was provided into which a copper coupon was placed. No measurable corrosion by weight loss or visible corrosion observed for 3 years.

Example 7

A corrosion inhibiting composition containing distilled deionized water adjusted to pH 6.0 with sulfuric acid, 100 ppm sodium nitrite and 1 ppm Au nanoparticles made using laser ablation with an average size of the Au nanoparticles being between approximately 40-60 nm was provided into which a admiralty brass coupon was placed. No measurable corrosion by weight loss or visible corrosion observed for 3 years.

Although the foregoing has been described in some detail by way of illustrations and examples for purposes of clarity and understanding, it will be understood by those of skill in the art that numerous and various modifications can be made. Therefore, it should be clearly understood that the forms disclosed herein are illustrative only and are not intended to limit the scope of the present disclosure.

The invention claimed is:

1. An anti-corrosion composition, comprising:
a carrier that is readily applied to a metal or metal alloy;
an electrolytic modifier, wherein the electrolytic modifier comprises a reducing agent for a metal, wherein the reducing agent includes one or more of nitrite, sulfite, phosphite, or polyphosphate, wherein the reducing agent is included at a concentration of between about 50 ppm and 200 ppm; and
a plurality of nonionic metal nanoparticles suspended in the carrier and selected in size and shape to locate at grain boundaries of a metal or metal alloy upon application of the carrier to the metal or metal alloy,
wherein the metal nanoparticles are formed from one or more metals selected from silver, platinum, palladium, stainless steel, silver alloys, gold alloys, platinum alloys, palladium alloys, austenite nickel-chromium alloys, nickel-copper alloys, or nickel-copper-iron-manganese alloys, and
wherein the anti-corrosion composition contains no more than about 100 ppm of the metal nanoparticles.

2. The anti-corrosion composition of claim 1, wherein the nonionic metal nanoparticles comprise at least one metal selected from the group consisting of silver-antimony (Ag—Sb) alloys, platinum alloys, palladium alloys, stainless steel, austenite nickel-chromium alloys, nickel-copper alloys, and nickel-copper-iron-manganese alloys.

3. The anti-corrosion composition of claim 1, wherein the nonionic metal nanoparticles comprise at least one metal alloy formed from at least one of gold, silver, platinum, or palladium alloyed with at least one of antimony, bismuth, or lead.

4. An anti-corrosion composition, comprising: a carrier that is readily applied to a metal or metal alloy;
an electrolytic modifier, wherein the electrolytic modifier comprises a reducing agent, and wherein the reducing agent includes one or more nitrite, sulfite, phosphite or polyphosphate included at a concentration of between about 50 ppm and 200 ppm; and
a plurality of nonionic metal nanoparticles suspended in the carrier and selected in size and shape to locate at grain boundaries of a metal or metal alloy upon application of the carrier to the metal or metal alloy.

5. The anti-corrosion composition of claim 4, wherein the electrolytic modifier is configured to alter the amount or strength of adsorption of the nanoparticles at the grain boundaries.

6. The anti-corrosion composition of claim 4, wherein the nonionic metal nanoparticles have a mean diameter or length and wherein at least 99% of the metal nanoparticles have a diameter or length within 30% of the mean diameter or length.

7. The anti-corrosion composition as in claim 4, wherein the nonionic metal nanoparticles have a ξ-potential with an absolute value of at least 10 mV.

8. The anti-corrosion composition of claim 4, wherein the nonionic metal nanoparticles include spherical-shaped nanoparticles, and wherein the spherical-shaped nanoparticles have a mean diameter and wherein at least 99% of the spherical-shaped nanoparticles have a diameter within ±3 nm of the mean diameter.

9. The anti-corrosion composition of claim 4, wherein the volatility of the carrier allows for quick evaporation of the carrier and rapid deposition of the nanoparticles onto a surface of a metal or alloy.

10. The anti-corrosion composition of claim 4, wherein the viscosity of the carrier allows for sufficient coating of a surface of a metal or metal alloy.

11. The anti-corrosion composition of claim 4, wherein the metal nanoparticles are formed from one or more metals selected from the group consisting of silver, gold, platinum, palladium, rhodium, osmium, ruthenium, rhodium, rhenium, molybdenum, copper, iron, stainless steel, nickel, tin, beryllium, cobalt, antimony, chromium, manganese, zirconium, zinc, tungsten, titanium, vanadium, lanthanum, cerium, heterogeneous mixtures thereof, and alloys thereof.

12. The anti-corrosion composition of claim 4, wherein the nonionic metal nanoparticles comprise at least one metal alloy selected from the group consisting of silver-antimony (Ag—Sb) alloys, platinum alloys, palladium alloys, stainless steel, austenite nickel-chromium alloys, nickel-copper alloys, nickel-copper-iron-manganese alloys, and alloys formed from at least one of gold, silver, platinum, or palladium alloyed with at least one of antimony, bismuth, or lead.

13. An anti-corrosion composition, comprising:
a carrier that is readily applied to a metal or metal alloy;
an electrolytic modifier that includes one or more of nitrite, sulfite, phosphite, or polyphosphate included at a concentration of between about 50 ppm and 200 ppm; and
a plurality of nonionic metal nanoparticles suspended in the carrier and selected in size and shape to locate at grain boundaries of a metal or metal alloy upon application of the carrier to the metal or metal alloy,
wherein the metal nanoparticles are formed from one or more ground state metals selected from the group consisting of silver, gold, platinum, palladium, rhodium, osmium, ruthenium, rhodium, rhenium, molybdenum, copper, iron, stainless steel, nickel, tin, beryllium, cobalt, antimony, bismuth, lead, chromium, manganese, zirconium, zinc, tungsten, titanium, vanadium, lanthanum, cerium, heterogeneous mixtures thereof, and alloys thereof.

14. The anti-corrosion composition of claim 13, wherein the anti-corrosion composition contains no more than about 100 ppm of the metal nanoparticles.

15. The anti-corrosion composition of claim 13, wherein the nonionic metal nanoparticles comprise at least one metal alloy selected from the group consisting of silver-antimony (Ag—Sb) alloys, platinum alloys, palladium alloys, stainless steel, austenite nickel-chromium alloys, nickel-copper alloys, nickel-copper-iron-manganese alloys, and alloys formed from at least one of gold, silver, platinum, or palladium alloyed with at least one of antimony, bismuth, or lead.

16. An anti-corrosion composition, comprising:
a carrier that is readily applied to a metal or metal alloy;
an electrolytic modifier that includes one or more of nitrite, sulfite, phosphite, or polyphosphate included at a concentration of between about 50 ppm and 200 ppm; and
a plurality of nonionic metal nanoparticles suspended in the carrier and selected in size and shape to locate at grain boundaries of a metal or metal alloy upon application of the carrier to the metal or metal alloy,
wherein the nonionic metal nanoparticles comprise at least one metal alloy selected from the group consisting of silver-antimony (Ag—Sb) alloys, platinum alloys, palladium alloys, stainless steel, austenite nickel-chromium alloys, nickel-copper alloys, nickel-copper-iron-manganese alloys, and alloys formed from at least one of gold, silver, platinum, or palladium alloyed with at least one of antimony, bismuth, or lead.

17. The anti-corrosion composition of claim 16, wherein the nonionic metal nanoparticles comprise a silver-antimony (Ag—Sb) alloy.

* * * * *

UNITED STATES PATENT AND TRADEMARK OFFICE
CERTIFICATE OF CORRECTION

PATENT NO. : 10,774,429 B2  
APPLICATION NO. : 15/098071  
DATED : September 15, 2020  
INVENTOR(S) : Tarbet et al.

Page 1 of 1

It is certified that error appears in the above-identified patent and that said Letters Patent is hereby corrected as shown below:

In the Specification

Column 4  
Line 30, change "nanoparticles" to –nanoparticle–

Column 5  
Line 12, change "resistance" to –resistant–  
Line 65, change "resistance" to –resistant–

Column 7  
Line 56, change "as stabilizing" to –as a stabilizing–

Column 8  
Line 29, change "soaking solution" to –soaking solutions–

Column 11  
Line 28, change "embodiment" to –embodiments,–

Column 13  
Line 42, change "month2" to –months–

In the Claims

Column 14  
Line 43, change "more nitrite" to –more of nitrite–

Signed and Sealed this  
Twenty-ninth Day of December, 2020

Andrei Iancu  
*Director of the United States Patent and Trademark Office*